US012783354B2

(12) United States Patent
Frayer

(10) Patent No.: US 12,783,354 B2
(45) Date of Patent: Nov. 3, 2026

(54) NON-VOLATILE MEMORY WITH ENHANCED FOGGY-FINE ENCODING

(71) Applicant: Sandisk Technologies, Inc., Milpitas, CA (US)

(72) Inventor: Jack Frayer, Mountain View, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 58 days.

(21) Appl. No.: 18/954,996

(22) Filed: Nov. 21, 2024

(65) Prior Publication Data

US 2026/0140825 A1 May 21, 2026

(51) Int. Cl.
*G06F 11/00* (2006.01)
*G06F 11/10* (2006.01)

(52) U.S. Cl.
CPC ...... *G06F 11/1068* (2013.01); *G06F 11/1048* (2013.01)

(58) Field of Classification Search
None
See application file for complete search history.

(56) References Cited

U.S. PATENT DOCUMENTS 11,177,002 B1 11/2021 Pitner
11,269,725 B2 3/2022 Sharon
11,456,038 B2 9/2022 Nguyen
11,495,296 B2 * 11/2022 Alrod ..................... G11C 16/26
11,650,756 B2 5/2023 Alrod
2014/0003152 A1 * 1/2014 Sharon ................... G11C 16/26 365/185.18
2022/0107751 A1 * 4/2022 Gorobets ............ G11C 11/5628
2022/0206710 A1 * 6/2022 Alrod ..................... G06F 11/108
2022/0230685 A1 * 7/2022 Alrod .................. G11C 11/5671
2023/0140746 A1 * 5/2023 Jung ...................... G11C 29/44 714/764
2023/0282294 A1 * 9/2023 Gorobets ............ G11C 11/5628 365/185.22
2024/0221802 A1 * 7/2024 Venugopal ........... G11C 7/1069

* cited by examiner

*Primary Examiner* — Mujtaba M Chaudry
(74) *Attorney, Agent, or Firm* — Arlene P. Neal; NEAL BLIBO LLC

(57) ABSTRACT

A memory die executes enhanced foggy-fine program operations to recover foggy programmed data including a distribution that has extended into multiple states. The die includes blocks to store data in various formats. A memory controller on the die receives data from a storage device and generate parity data and enhanced foggy data based on the data received from the storage device. The memory controller stores the parity data and the enhanced foggy data to a cache prior to performing a foggy program operation to a block. The memory controller uses the parity data and the enhanced foggy data to recover the data when a foggy distribution associated with the foggy program operation crosses beyond an adjacent distribution. The memory controller then writes the recovered data to the block with a fine program operation.

20 Claims, 9 Drawing Sheets

| EVENT | GREEN | PARITY | RECOVERED BITS |
|---|---|---|---|
| 0 | 1111 | E | 1111 |
| 1 | 1111 | O | 0111 |
| PD1 | 0111 | E | 1111 |
| 0 | 0111 | O | 0111 |
| 2 | 0101 | E | 1100 |
| PD1 | 0101 | O | 0111 |
| 1 | 1101 | E | 1100 |
| 2 | 1101 | O | 0100 |
| 0 | 1100 | E | 1100 |
| 1 | 1100 | O | 0101 |
| PD1 | 0100 | E | 1100 |
| 0 | 0100 | O | 0100 |
| 2 | 0000 | E | 0011 |
| PD1 | 0000 | O | 0100 |
| 1 | 0001 | E | 0011 |
| 2 | 0001 | O | 0100 |
| 0 | 0011 | E | 0011 |
| 1 | 0011 | O | 0010 |
| PD1 | 0010 | E | 0011 |
| 0 | 0010 | O | 0010 |
| 2 | 0110 | E | 1010 |
| PD1 | 0110 | O | 0010 |
| 1 | 1110 | E | 1010 |
| 2 | 1110 | O | 1000 |
| 0 | 1010 | E | 1010 |
| 1 | 1010 | O | 1000 |
| PD1 | 1000 | E | 1010 |
| 0 | 1000 | O | 1000 |
| PD2 | 1001 | E | 1010 |
| PD2 | 1001 | O | 1001 |
| PD2 | 1011 | E | 1010 |
| PD2 | 1011 | O | 1000 |
| GREEN BIT TABLE *604* | | | |

| EVENT | RED | PARITY | RECOVERED BITS |
|---|---|---|---|
| 2 | 1111 | E | 0101 |
| 3 | 1111 | O | 1101 |
| 1 | 0111 | E | 0101 |
| 2 | 0111 | O | 1101 |
| 0 | 0101 | E | 0101 |
| 1 | 0101 | O | 1101 |
| PD1 | 1101 | E | 0101 |
| 0 | 1101 | O | 1101 |
| 2 | 1100 | E | 0000 |
| PD1 | 1100 | O | 1101 |
| 1 | 0100 | E | 0000 |
| 2 | 0100 | O | 0001 |
| 0 | 0000 | E | 0000 |
| 1 | 0000 | O | 0001 |
| PD1 | 0001 | E | 0000 |
| 0 | 0001 | O | 0001 |
| 2 | 0011 | E | 0110 |
| PD1 | 0011 | O | 0001 |
| 1 | 0010 | E | 0110 |
| 2 | 0010 | O | 1110 |
| 0 | 0110 | E | 0110 |
| 1 | 0110 | O | 1110 |
| PD1 | 1110 | E | 0110 |
| 0 | 1110 | O | 1110 |
| 2 | 1010 | E | 1001 |
| PD1 | 1010 | O | 1110 |
| 1 | 1000 | E | 1001 |
| 2 | 1000 | O | 1011 |
| 0 | 1001 | E | 1001 |
| 1 | 1001 | O | 1011 |
| PD1 | 1011 | E | 1001 |
| 0 | 1011 | O | 1011 |
| RED BIT TABLE *606* | | | |

ENCODED RECOVERY TABLE

602

*FIG. 6*

NON-VOLATILE MEMORY WITH ENHANCED FOGGY-FINE ENCODING

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and the storage device may store data in blocks on the memory device. Data may be stored in the blocks in various formats, with the formats being defined by the number of bits that may be stored per memory cell. For example, a single-level cell (SLC) format may write one bit of information per memory cell, a multi-level cell (MLC) format may write two bits of information per memory cell, a triple-level cell (TLC) format may write three bits of information per memory cell, a quadruple-level cell (QLC) format may write four bits of information per memory cell, and so on.

The format used to store data on the memory device may determine how data is coded in the cells on the memory device. Unlike a SLC storage device with a single threshold voltage and a transistor that is either on or off, a QLC cell storage device may have sixteen possible voltage states. Data may be coded on a multi-bit cell based on different states of the memory cell and may be coded in a top page, an upper page, a middle page, and a lower page.

Data may be written to, for example, QLC memory cells using a direct write/program (also referred to herein as an MLC fine write) operation. With the MLC fine write operation, two pages may be written to the memory cells and read from the memory cells and two more pages may be written to the memory cells and the four pages may be read from the memory cell. Data may also be written to QLC memory cells using a foggy-fine programming operation which may include a first (foggy) programming operation and a second (fine) programming operation. With the foggy operation, four pages may be programmed to first/approximate distributions. The first distributions may overlap and when the memory cells that are in the first distributions are read, a large number of errors may occur because of the overlaps. One or more parity pages may be calculated for the data that is foggy programmed, and the parity page(s) may be stored in a data cache, for example, SLC memory on the memory device. The parity data may be combined with the foggy data to read and recover the data programmed in foggy operations. The fine operation may be used to later program the foggy data recovered with the parity data to second (more accurate) distributions. The storage device performance may be limited when using foggy-fine operations due to transfers on the bus between the storage device and the memory device and/or the loss of over-provisioning used as a data cache, typically four pages of SLC memory. However, the write speed associated with the MLC fine operation may be slower than that of the foggy-fine operation. Hence, the foggy-fine operation may be used to obtain better write performance on the storage device.

The storage device may have certain data retention requirements. For example, the storage device may have to retain the data for a given period (for example, three months) at a given temperature (for example 40 degrees Celsius) when there is no power to the storage device. If the storage device loses power after the foggy operation is performed and before the fine operation is performed, the overlaps between the first distributions may increase beyond adjacent distributions overtime. As such, the memory cells may not have sufficient margins for the data to be reliably recovered and read after the power loss to meet the data retention requirements.

SUMMARY OF THE INVENTION

In some implementations, a memory die may execute enhanced foggy-fine program operations to recover foggy programmed data including a distribution that has extended into multiple states. The memory die may include blocks to store data in various formats. A memory controller on the memory die may receive data from a storage device. The memory controller may generate parity data and enhanced foggy data based on the data received from the storage device. The memory controller may perform a foggy program operation to a block and use the parity data and the enhanced foggy data to recover the data when a foggy distribution associated with the foggy program operation crosses beyond adjacent distributions. The memory controller may write recovered data to the block with a fine program operation.

In some implementations, a method is provided for executing enhanced foggy-fine program operations to recover foggy programmed data including a distribution that has extended into multiple states. The method includes receiving data from a storage device, generating parity data and enhanced foggy data based on the data received from the storage device, and storing the parity data and the enhanced foggy data to a cache. The method also includes performing a foggy program operation to a block on the memory die and performing a foggy read to retrieve data written with the foggy program operation. The method further includes using the parity data and the enhanced foggy data to determine that a foggy distribution associated with the foggy program operation crosses beyond adjacent distributions. The method also includes performing a foggy recovery by applying the parity data and the enhanced foggy data to recover data associated with the foggy distribution and writing recovered data to the block with a fine program operation.

In some implementations, a method is provided for executing enhanced foggy-fine operations to recover foggy programmed data including a distribution that has extended into multiple states. The method includes receiving data from a storage device, generating parity data and enhanced foggy data based on the data received from the storage device, and storing the parity data and the enhanced foggy data in a cache. The method also includes performing a foggy program operation to store the data on a block on the memory die and performing a foggy read to retrieve data written with the foggy program operation. The method further includes using the parity data and the enhanced foggy data to determine that a foggy distribution associated with the foggy program operation crosses into at least one other state. The method also includes performing a foggy recovery by applying the parity data and the enhanced foggy data to a recovery table to locate an entry in the recovery table including recovered data associated with the foggy distribution and writing the recovered data to the block with a fine program operation.

BRIEF DESCRIPTION OF THE DRAWINGS

FIG. 6 illustrates an example of an encoded recovery table that may be applied to a memory die coded according to the first transition in accordance with some implementations.

Figure 1:
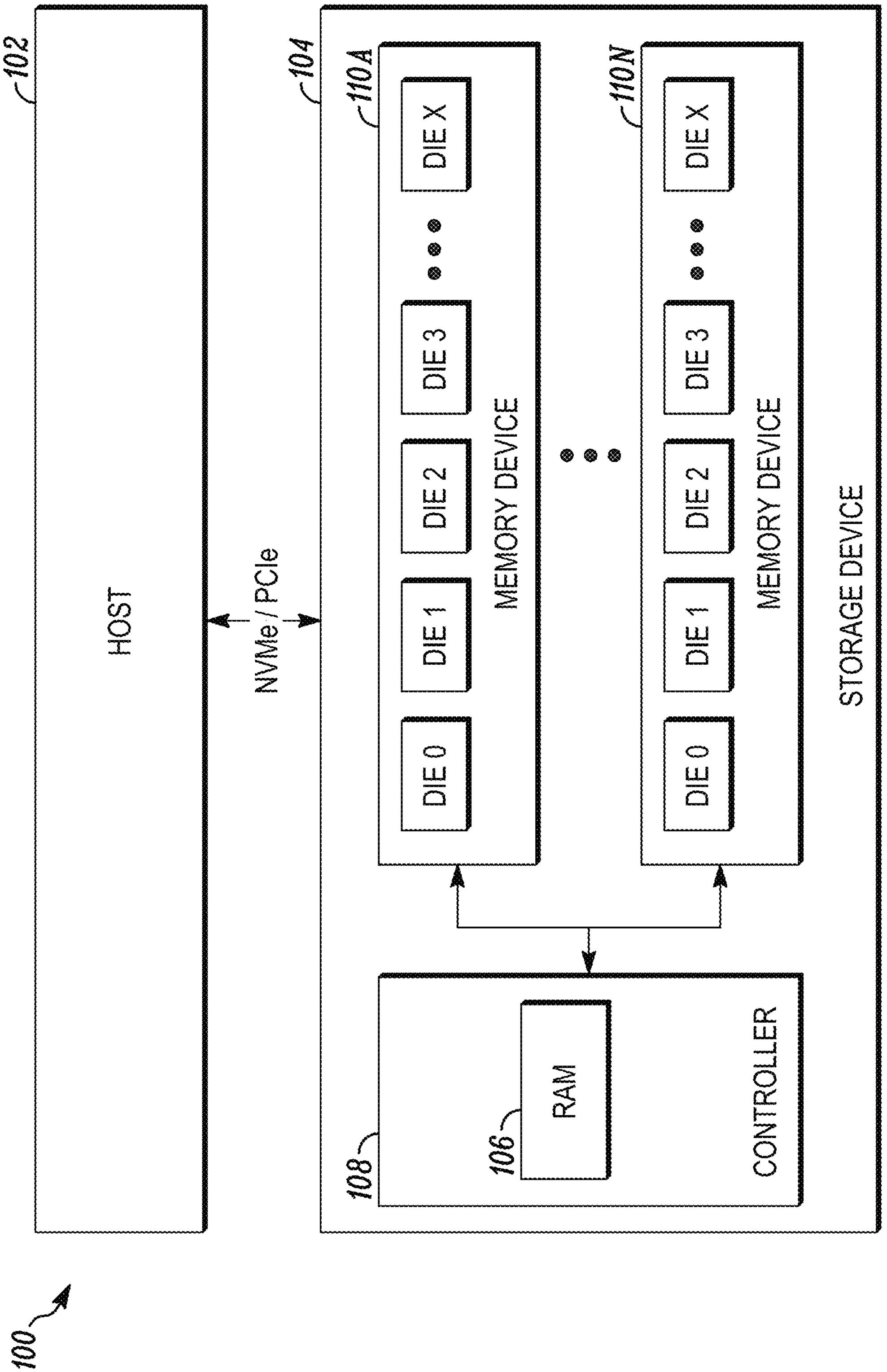
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various implementations, may be disposed in one or more different locations relative to the host 102 and storage device 104 may communicate with host 102 over a peripheral component interconnect express (PCIe) protocol and the like. Host 102 may include additional components (not shown in this figure for the sake of simplicity).

Storage device 104 may include a random-access memory (RAM) 106, a controller 108, one or more non-volatile memory devices 110*a*-110*n* (referred to herein as the memory device(s) 110). Storage device 104 may be, for example, a solid-state drive (SSD). RAM 106 may be static RAM (SRAM) or dynamic RAM (DRAM) that may be used to store information used on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may execute garbage collection, read refresh, and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include one or more dies (for example, DIE 0-DIE X) connected to a memory bus 112 including data lines and chip enable lines. Memory bus 112 may communicate with a toggle mode (TM) interface (not shown) to communicatively couple memory device 110 to controller 108. The dies may be divided into blocks to store the data and data may be stored in various formats, including, for example, SLC format, MLC format, TLC format, and/or QLC format. Memory device 110 may be included in storage device 104 or may be otherwise communicatively coupled to storage device 104. FIG. 1 is provided as an example. Other examples may differ from what is described in FIG. 1.

Figure 2:
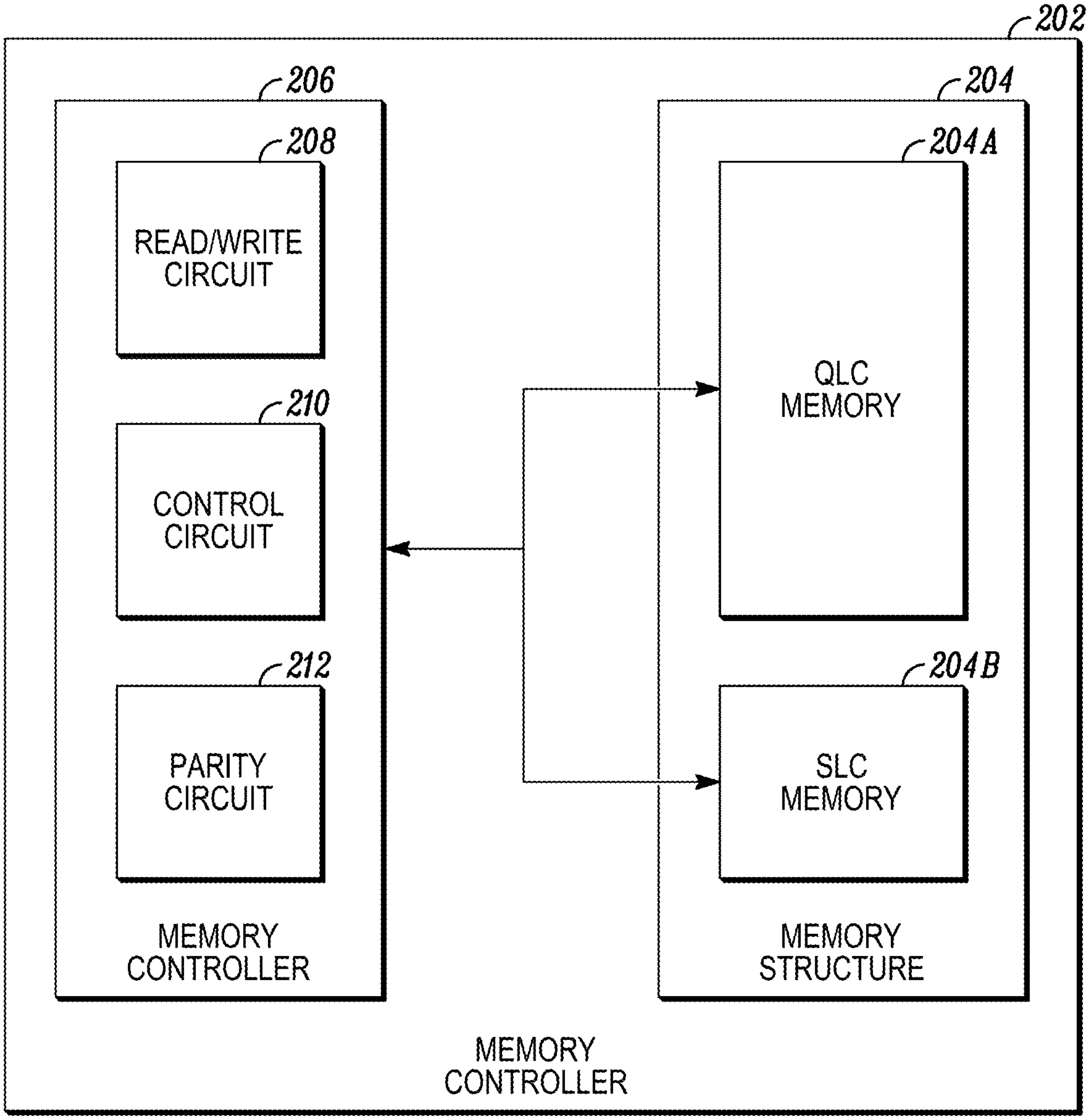
FIG. 2 is an example functional block diagram of a memory die in accordance with some implementations.

FIG. 2 is an example functional block diagram of a memory die in accordance with some implementations. Memory die 202 may include one or more memory structures 204 and a memory controller 206. Memory structures 204 may include configurable memory sections that may include blocks for storing data in a given format. For example, memory structures 204 may include a QLC memory 204*a* that may include a first set of blocks for storing data in a (first) QLC format and an SLC memory 204*b* that may include a second set of blocks for storing data in a (second) SLC format.

Memory controller 206 may include read/write circuits 208, a control circuit 210, and a parity circuit 212. Read/write circuit 206 may include sensing circuitry to enable a page of memory cells in memory structure 204 to be read or programmed in parallel. Control circuity 210 may provide die-level control of memory operations, control the power and voltages suppled to the word lines and bit lines during memory operations, and cooperate with read/write circuit 206 to perform memory operations on memory structure 204. Parity circuit 212 may generate parity data by (exclusive ORing (XOR) data stored in the lower, middle, upper and top pages of a memory cell. Parity circuit 212 may generate an odd parity or an even parity, wherein the odd parity may be used to determine when a foggy distribution has shifted to the left and the even parity may be used to determine when a foggy distribution has shifted to the right. Parity circuit 212 may also generate enhanced foggy data that may be used to add more granularity in enabling memory controller 206 to separate states in a distribution. For example, the enhanced foggy data may be a red/green (RG) bit associated with a foggy distribution. The green bit may be used to determine when a distribution has shifted to the left and a red bit may be used to determine when a distribution has shifted to the right. Parity circuit 212 may also generate other enhanced foggy data and the RG bit is only provided as an example.

When data is transferred from controller 108 to memory device 110, parity circuit 212 may use the data to generate the parity page(s) and RG bit. Parity circuit 212 may use an algorithm (referred to herein as an F algorithm) to generate the green bit including by setting an internal working register (referred to herein as the F register) to zero, reading data foggy programmed to data registers (referred to herein as A, B, C, and D registers) in the die, and using SET, AND, NOT, and OR logical operations to calculate a green bit that may be stored in the F register. Parity circuit 212 may also use the SET, AND, NOT, and OR logical operations to generate flags. The flags may be, for example, even and green (EG), even and red (ER), odd and green (OG), and odd and red (OR). Memory controller 206 may use the flags and the value stored in the F register to correct foggy programmed data. The parity page(s), RG bit, and flags may be stored in SLC memory 204*b* until fine programming is initiated and the data resulting from the fine programming may be saved on QLC memory 204*b*. This may enable foggy-fine programming to be performed with a relatively lower volume of traffic on bus 112 between controller 108 and memory device 110. FIG. 2 is provided as an example. Other examples may differ from what is described in FIG. 2.

Figure 3:
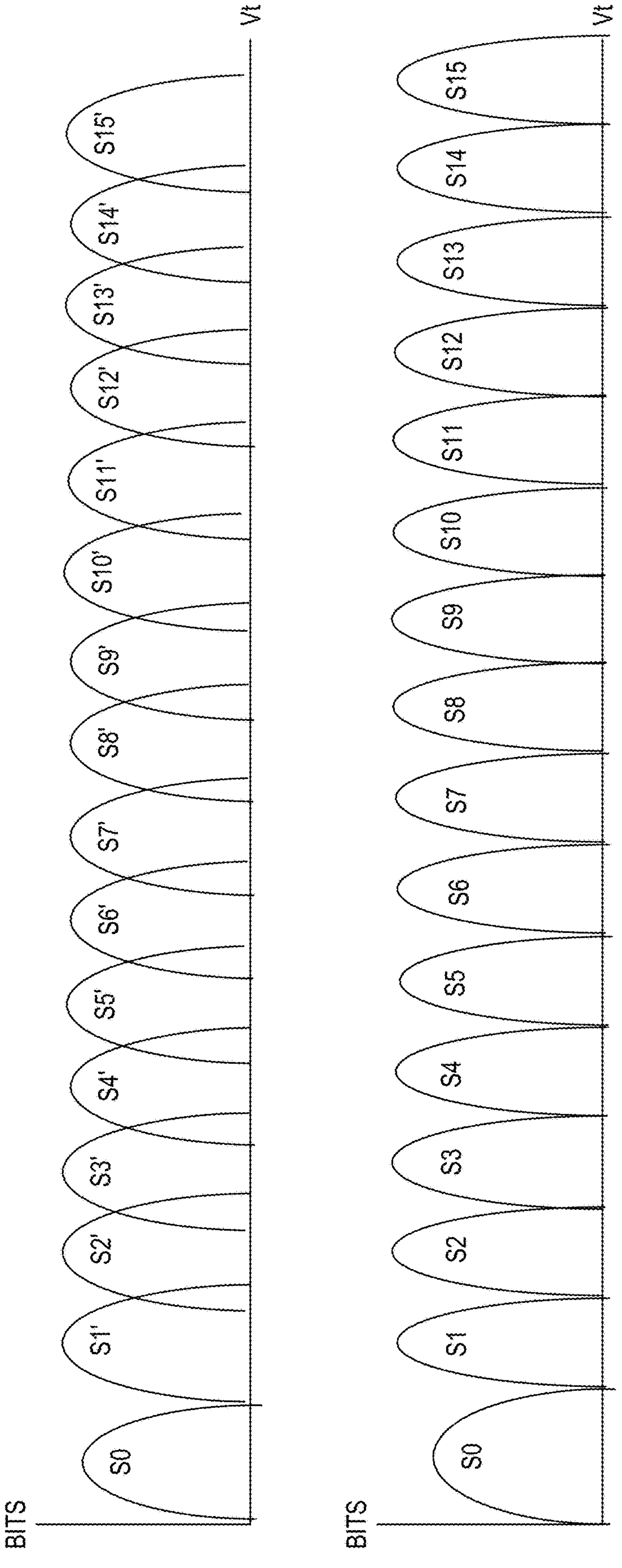
FIG. 3 illustrates an example of foggy-fine programming of a group of QLC memory cells using sixteen distributions corresponding to sixteen data states and parity data in accordance with some implementations.

FIG. 3 illustrates an example of foggy-fine programming of a group of QLC memory cells using sixteen distributions corresponding to sixteen data states and parity data in accordance with some implementations. At a start of the program operation, the memory cells may be in erased distribution (s0) prior to foggy programming. The memory cells may be foggy programmed to first distributions (shown as S1'-S15'). There may typically be a one state overlap between distributions S1'-S15' after the foggy programming to speed up the overall write speed. For example, S1' may overlap S2', S2' may overlap S3', and so on. Reading memory cells that are in the first distributions with such overlaps may result in a large number of errors, for example, more errors than can be corrected with an error correction coder (ECC). Memory controller 206 may therefore generate parity data for memory cells that are programmed in the first distributions. Memory controller 206 may use the parity data to recover the programmed data from the foggy distributions. For example, memory cells that are programmed to the S1' distribution in a foggy program operation may be recovered with the parity data and subsequently programed to the S1 distribution with a fine program operation, memory cells that are programmed to the S2' distribution in a foggy program operation may be recovered with the parity data and subsequently programed to the S2 distribution with a fine program operation, and so on. FIG. 3 is provided as an example. Other examples may differ from what is described in FIG. 3.

Figure 4:
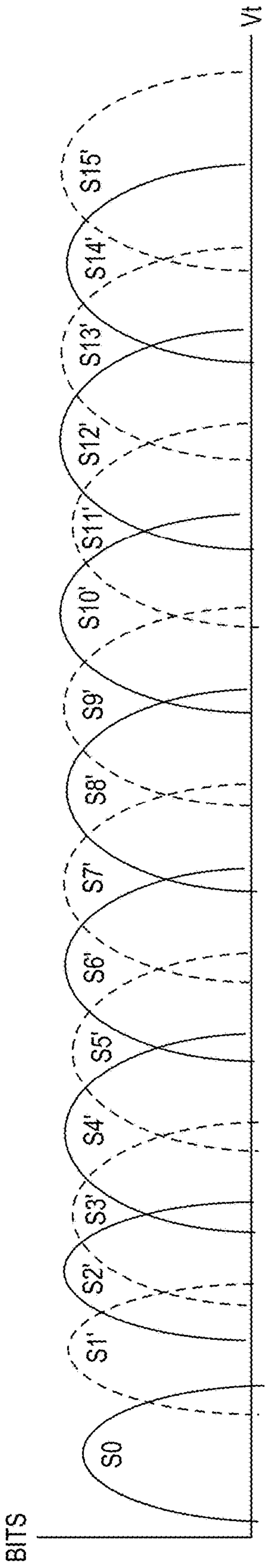
FIG. 4 illustrates an example of foggy programmed distributions wherein the overlaps between distributions extend beyond adjacent states in accordance with some implementations.

If, for example, storage device 104 loses power after the foggy program operation is performed and before the fine program operation is performed or the data remains in the foggy state too long before the fine program operation is implemented while memory device 110 is active, the overlaps between the first distributions may increase beyond adjacent states overtime. FIG. 4 illustrates an example of foggy programmed distributions wherein the overlaps between distributions extend beyond adjacent states in accordance with some implementations. For example, the first distributions shown in FIG. 4 are shown to have shifted to the left beyond the adjacent distribution. As such, the S3' distribution is shown to overlap with the adjacent distribution S2' and with S1', S4' distribution is shown to overlap with the adjacent distribution S3' and with S2', and so on. Prior to foggy programming the data, a state associated with each of the first distributions generated during foggy programming may be assigned a green or red (RG) bit. In an implementation, the same RG bit may not be assigned to adjacent states. For example, a state associated with S1' may be assigned a green bit, a state associated with S2' may be assigned a red bit, a state associated with S3' may be assigned a green bit, a state associated with S4' may be assigned a red bit, and so on. In FIG. 4, the distributions that are associated with states that are assigned the green bit are shown with dashed line. As noted, the parity data and the RG bits for the first distributions may be stored in SLC memory 204*b*. Memory controller 206 may use the parity data and the RG bits with an encoded recovery table to recover data from the first distributions (i.e., S1'-S15'). FIG. 4 is provided as an example. Other examples may differ from what is described in FIG. 4.

Figure 5:
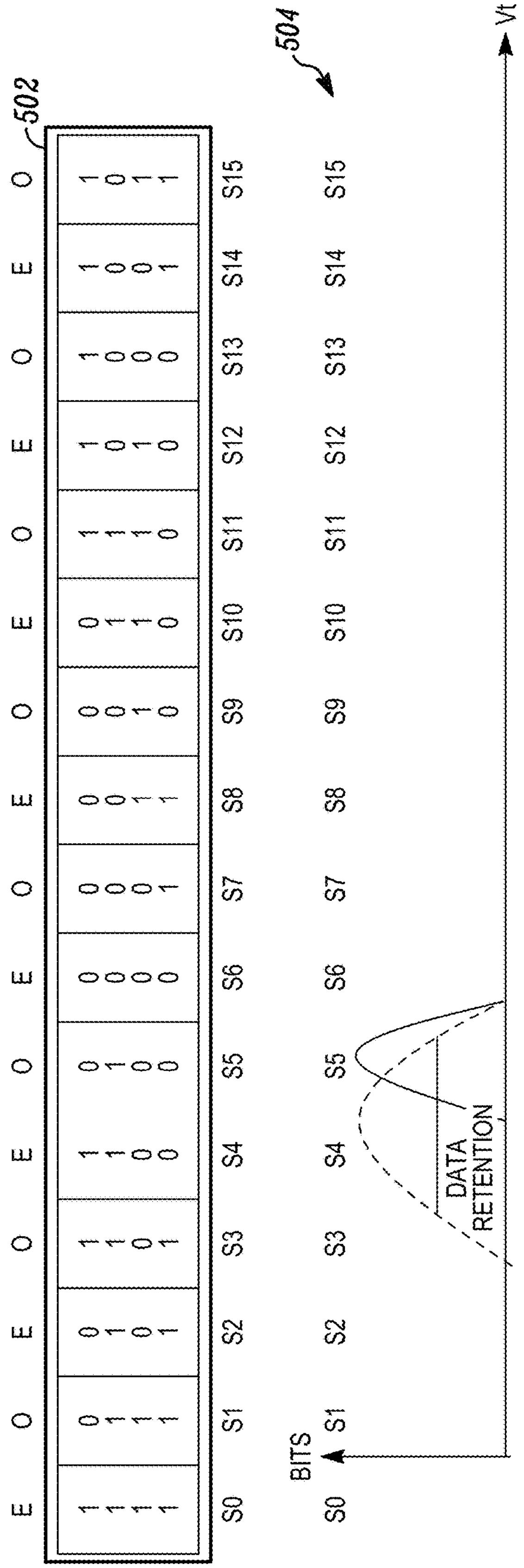
FIG. 5 illustrates an example of a memory die coded according to a first transition in accordance with some implementations.

FIG. 5 illustrates an example of a memory die coded according to a first transition in accordance with some implementations. The memory die may be coded such that there may be four transitions from 1 to 0 on the top row, three transitions from 1 to 0 on the next row, four transitions from 1 to 0 on the next row, and four transitions from 1 to 0 on the bottom row, as shown in 502. As such, the memory die may be coded using a first (i.e., 4344) transition. The memory die may be coded using other transitions and the 4344 transition is only provided as an example.

Adjacent states may be assigned even or odd parity. For example, S1 may be assigned an odd parity (shown as O), S2 may be assigned an even parity (shown as E), S3 may be assigned an odd parity, S4 may be assigned an even parity, and so on. 504 shows an example where the foggy programmed distribution for state 5 (S5) may have shifted to the left beyond the adjacent state (i.e., beyond S4 into S3). The distribution for S5 is shown in 504 with a solid line and the distribution shift is shown with a dashed line. In 502, the foggy data written in S5 is 0100, the parity is odd, and the assigned bit is green. If during a QLC read, memory controller 206 retrieves 1101 (i.e., the data from S3) because of the leftward shift, memory controller 206 may determine the RG bit assigned to S5 is green and the parity is odd. Memory controller 206 may determine that the distribution has shifted beyond the adjacent distribution because S3 and S5 are both assigned a green bit and odd parity. Memory controller 206 may use an encoded recovery table to recover the data. FIG. 5 is provided as an example. Other examples may differ from what is described in FIG. 5.

FIG. 6 illustrates an example of an encoded recovery table that may be applied to a memory die coded according to the first transition in accordance with some implementations. Entries in encoded recovery table 602 may be based on how a memory die is coded. Encoded recovery table 602 may include a green bit table 604 and a red bit table 606. Green bit table 604 may include an event column associated with an event (for example, the number of states in a distribution), a green column including retrieved bits that may be read from a state assigned a green bit, a parity column identifying an even or odd parity assigned to a state, and a recovered bit column including the recovered bits that may be programmed with fine programming. Red bit table 606 may also include an event column associated with an event, a red column including retrieved bits that may be read from a state assigned a red bit, a parity column identifying an even or odd parity assigned to a state, and a recovered bit column including the recovered bits that may be programmed with fine programming.

If the event in green bit table 604 or red bit table 606 is a zero, then no error (i.e., no shifting of a distribution) may have occurred. If the event is one, there may be a one state data retention shift (i.e., a distribution may have shifted to an adjacent state), if the event is two, there may be a two-state data retention shift (i.e., a distribution may have shifted beyond an adjacent state to the next state), and if the event is three, there may be a three-state data retention shift (i.e., a distribution may have shifted beyond an adjacent state to the next two states). When charge is added to nearby memory cells, the threshold voltages of previously programmed memory cells may increase so that the threshold voltage distributions may change in what may be referred to as "program disturb". The event in green bit table 604 or red bit table 606 may also be a one state program disturb (PD1), or a two-state program disturb (PD2).

Using recovery table 602 on a memory die coded according to a first transition, as shown in FIG. 5, if, for example, memory controller 206 retrieves 1101 when reading the data for S5 because the distribution have shifted to S3, memory controller 206 may determine that a green bit and an odd parity is assigned to both S3 and S5. Memory controller 206 may determine based on, for example, the parity and/or RG bits assigned to S3 and S5, that the distribution for S5 has shifted over two states, i.e., the distribution for S5 has shifted beyond the adjacent distribution because S3 and S5 may have the same parity and RG bit. Using green bit table 604 and as shown in the shaded section, when the event is 2, the retrieved bits in the green column are 1101, and the parity is odd, memory controller 206 may recover bits from the recovered bit column (i.e., 0100) and program 0100 into S5 during fine programing operations. FIG. 6 is provided as an example. Other examples may differ from what is described in FIG. 6.

Figure 7:
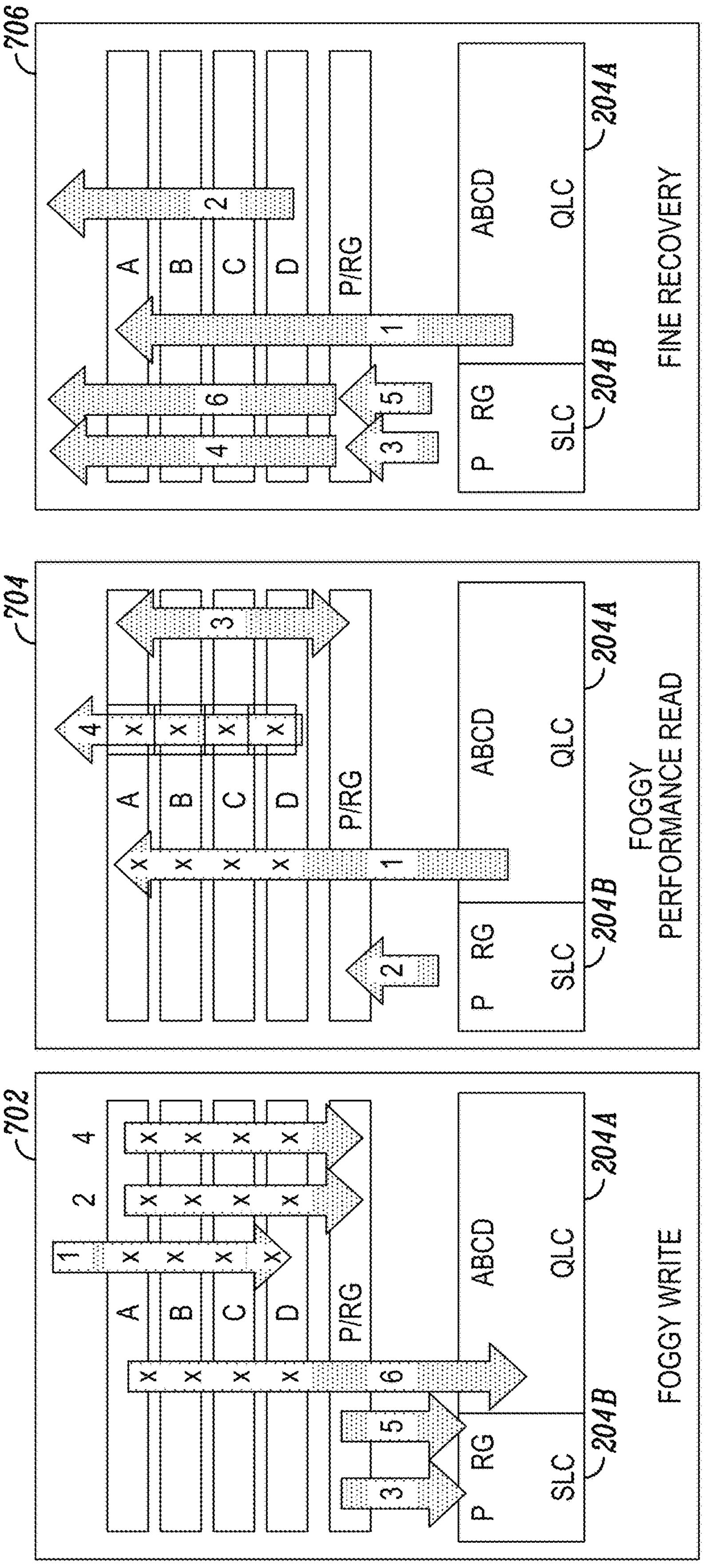
FIG. 7 is an example block diagram showing data paths for a foggy write operation, foggy performance read operation, and a fine recovery operation in accordance with some implementations.

FIG. 7 is an example block diagram showing data paths for a foggy write operation, foggy performance read operation, and a fine recovery operation in accordance with some implementations. The sequence of events in the data paths are numbered to illustrate example sequences in the data paths. In the foggy write operation, as shown in 702, controller 108 may transmit data (shown as ABCD) to memory device 110 and the data may be loaded into registers on memory device (shown as 1 in the sequence). Parity circuit 212 may generate a parity page by XORing the data in the registers (shown as 2 in the sequence) and may write the parity page into a cache (i.e., SLC memory 204*b*) (shown as 3 in the sequence). Parity circuit 212 may also generate the RG bit (shown as 4 in the sequence) and write the RG bit into the cache/SLC memory 204*b* (shown as 5 in the sequence). Memory controller 206 may then foggy write the data into QLC memory 204*a* (shown as 6 in the sequence).

In the foggy performance read operation, as shown in 704, memory controller 206 may read the data (shown as ABCD) from QLC memory 204*a* into the registers (shown as 1 in the sequence), read the parity page from SLC memory 204*b* (shown as 2 in the sequence), process the parity data with the data in the registers (shown as 3 in the sequence), and send the data to controller 108 (shown as 4 in the sequence).

In the fine recovery data path, as shown in 706, after memory controller 206 determines that there are data retention issues or an error in the foggy programmed data, memory controller 206 may read the data (shown as ABCD) from QLC memory 204*a* into the registers (shown as 1 in the sequence) and send the data to controller 108 (shown as 2 in the sequence). If controller 108 detects an error, memory controller 206 may read the parity page(s) (shown as 3 in the sequence), and send the parity page(s) to controller 108 (shown as 4 in the sequence), read the RG bit (shown as 5 in the sequence), and send the RG bit to controller 108 (shown as 6 in the sequence) for controller 108 to recover the data. It should be noted that memory device 110 may perform the data recovery, wherein memory controller 206 may read the data (shown as ABCD) from QLC memory 202*a* into the registers, detect an error, retrieve the parity page(s) and the RG bit from the cache/SLC memory 204*b*, and process the parity and the RG bit with the data to recover the data. When the data is recovered, memory device 110 may transmit the data to controller 108. FIG. 7 is provided as an example. Other examples may differ from what is described in FIG. 7.

Figure 8:
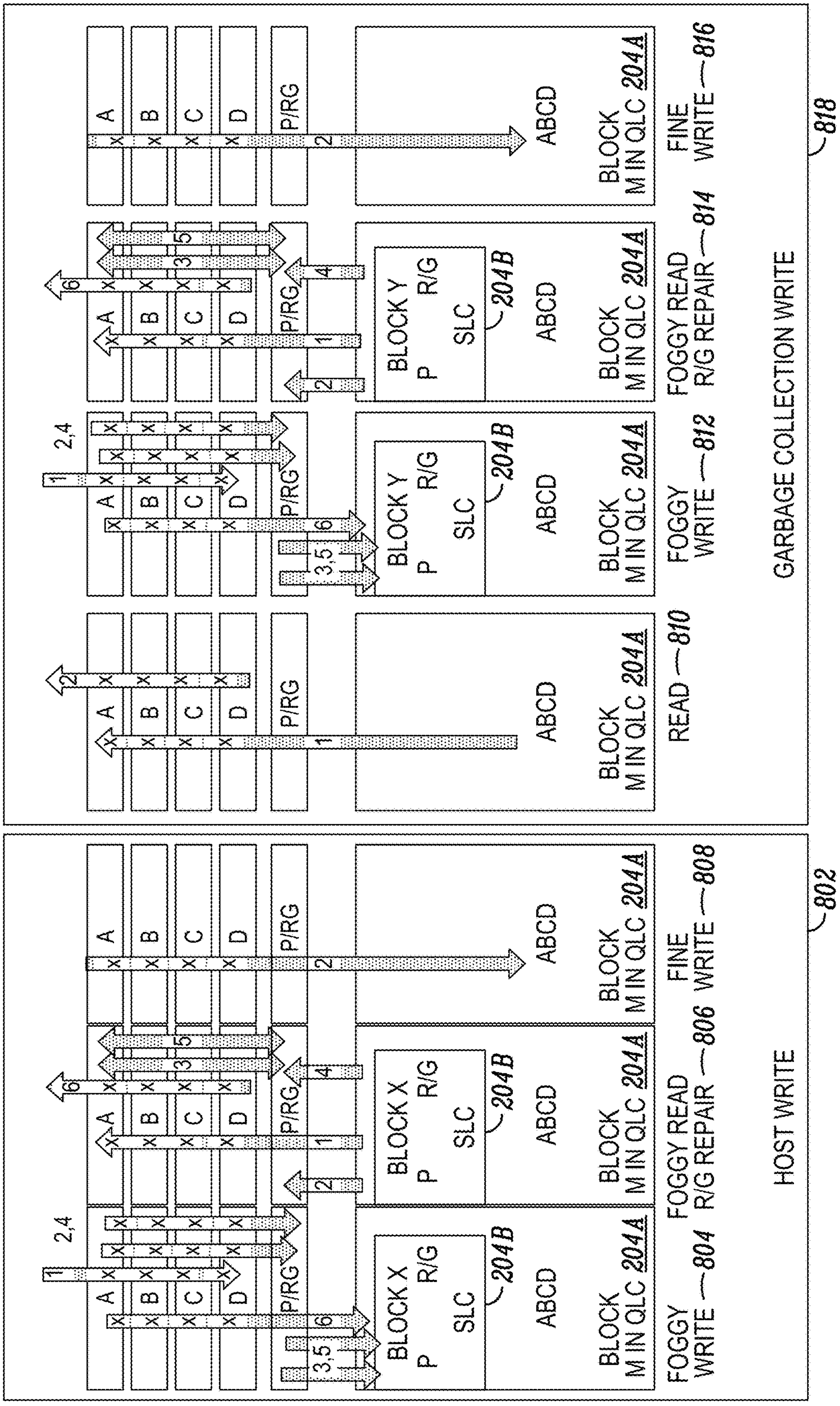
FIG. 8 is an example block diagram showing data paths for a host write operation and a garbage collection write operation in accordance with some implementations.

FIG. 8 is an example block diagram showing data paths for a host write operation and a garbage collection write operation in accordance with some implementations. The sequence of events in the data paths are numbered to illustrate example sequences in the data paths. A host write operation 802, may include a foggy write operation 804, foggy read R/G repair operation 806, and a fine write operation 808.

As part of foggy write operation 804, controller 108 may transmit data (shown as ABCD) to memory device 110 and the data may be loaded into registers on memory device (shown as 1 in the sequence). Parity circuit 212 may generate parity page(s) by XORing the data in the registers (shown as 2 in the sequence) and may write the parity page(s) into SLC memory 204*b* (shown as 3 in the sequence). Parity circuit 212 may also generate the RG bit (shown as 4 in the sequence) and write the RG bit into SLC memory 202*b* (shown as 5 in the sequence). The parity page(s) and RG bit may be written on block X in SLC memory 204*b*. Memory controller 206 may then foggy write the data on block M in QLC memory 204*a*.

As part of an optional foggy read RG repair operation 806, memory controller 206 may retrieve the data from QLC memory 204*a* (shown as 1 in the sequence) and the parity page(s) from SLC memory 204*b* (shown as 2 in the sequence) to determine if there is an error. Memory controller 206 may process the data with the parity page(s) (shown as 3 in the sequence), retrieve the RG bit from SLC memory 204*b* (shown as 4 in the sequence), process the data with the RG bit (shown as 5 in the sequence), and send the data to controller 108 (shown as 6 in the sequence). Controller 108 may audit the data by putting the data through an ECC engine. If controller 108 determines that the data has passed the audit, controller 108 may send the data to memory device 110 for a fine write operation 808. As part of fine write operation 808, memory controller 206 may write the data directly to QLC memory 204*a*.

If foggy read RG repair operation 806 is not performed, memory device 110 may transfer four pages (typically a maximum of 16384 bytes (B) plus parity bytes per page which could typically be four 4096 bytes plus parity bytes) on the bus between memory device 110 and controller 108 to execute host write 802. This operation could be performed on 1 to N planes of memory device 110. If optional foggy read RG repair operation 806 is performed, memory device 110 may transfer the four pages plus optional pages for the audit on the bus between memory device 110 and controller 108 to execute host write 802.

Garbage collection write operation 818 may include a read operation 810, a foggy write operation 812, a foggy read R/G repair operation 814, and a fine write operation 816. The sequence of events in the data paths are numbered. As part of read operation 810, the data is retrieved from QLC memory 204*a* (shown as 1 in the sequence) and transmitted to controller 108 (shown as 2 in the sequence).

After controller 108 corrects the data, controller 108 may transmit data (shown as ABCD) to memory device 110 and the data may be loaded into registers on memory device (shown as 1 in the sequence) as part of a foggy write operation 812. Parity circuit 212 may generate a parity page by XORing the data in the registers (shown as 2 in the sequence) and may write the parity page into SLC memory 204*b* (shown as 3 in the sequence). Parity circuit 212 may also generate the RG bit (shown as 4 in the sequence) and write the RG bit into SLC memory 204*b* (shown as 5 in the sequence). Memory controller 206 may then foggy write the data into another block (shown as block N) QLC memory 204*a* (shown as 6 in the sequence).

As part of an optional foggy read RG repair operation 814, memory controller 206 may retrieve the data from block N in QLC memory 204*a* (shown as 1 in the sequence) and the parity from SLC memory 204*b* (shown as 2 in the sequence) to determine if there is an error. Memory controller 206 may process the data with the parity (shown as 3 in the sequence), retrieve the RG bit from SLC memory 204*b* (shown as 4 in the sequence), process the data with the RG bit (shown as 5 in the sequence), and send the data to controller 108 (shown as 6 in the sequence). Controller 108 may audit the data by putting the data through an ECC engine. If controller 108 determines that the data has passed the audit, controller 108 may send the data to memory device 110 for a fine write operation 816. As part of fine write operation 816, memory controller 206 may write the data directly to QLC memory 204*a*.

If the audit/optional foggy read RG repair operation 814 is not performed as part of the garbage collection write 818, memory device 110 may transfer eight pages on bus 112 between memory device 110 and controller 108 to execute garbage collection write operation 818. If the audit is performed, memory device 110 may transfer the eight pages plus optional pages for the audit on bus 112 between memory device 110 and controller 108 to execute the garbage collection writes. FIG. 8 is provided as an example. Other examples may differ from what is described in FIG. 8.

Figure 9:
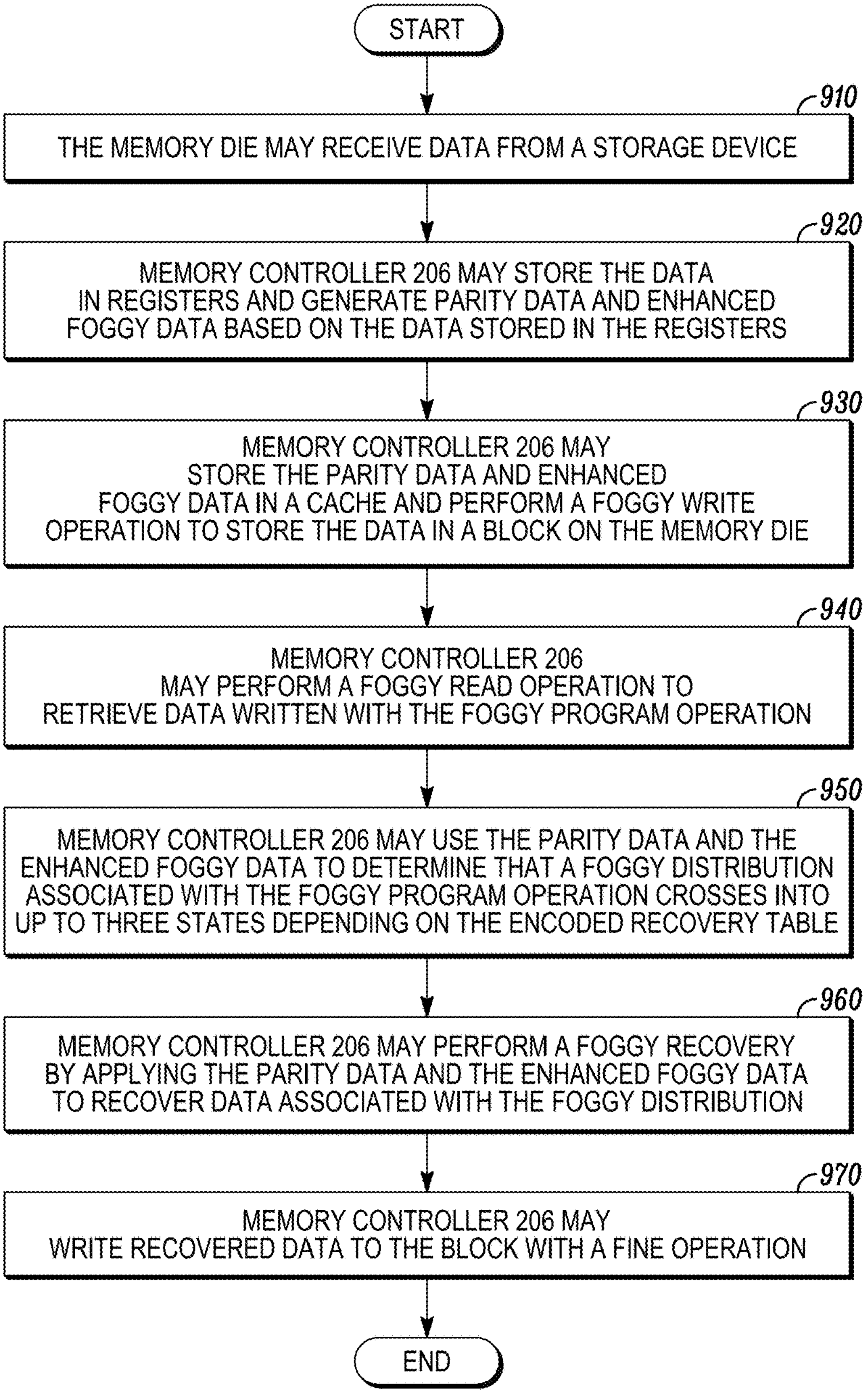
FIG. 9 is an example flow diagram for performing enhanced foggy-fine operations on a memory die in accordance with some implementations.

FIG. 9 is an example flow diagram for performing enhanced foggy-fine operations on a memory die in accordance with some implementations. At 910, the memory die may receive data from a storage device. At 920, memory controller 206 may store the data in registers and generate parity data and enhanced foggy data based on the data stored in the registers. At 930, memory controller 206 may store the parity data and enhanced foggy data in a cache and perform a foggy write operation to store the data in a block on the memory die. At 940, memory controller 206 may perform a foggy read operation to retrieve data written with the foggy program operation. At 950, memory controller 206 may use the parity data and the enhanced foggy data to determine that a foggy distribution associated with the foggy program operation crosses into up to three states depending on the encoded recovery table. At 960, memory controller 206 may perform a foggy recovery by applying the parity data and the enhanced foggy data to recover data associated with the foggy distribution. At 970, memory controller 206 may write recovered data to the block with a fine operation. As indicated above FIG. 9 is provided as an example. Other examples may differ from what is described in FIG. 9.

Unlike MLC-fine operations that may face a write performance limit, foggy-fine write performance may continue to scale into future memory devices 110. Although MLC-fine raw NAND writes may be inherently slower than foggy-fine write, the performance of storage device 104 may be limited when using foggy-fine write due to bus transfers between memory device 110 and controller 108 and/or loss of over-provisioning that may be used as a data cache, typically four-pages of SLC. As foggy-fine write speeds increase above 68 megabytes/second (MB/s), implementations of two-page encoded foggy-fine write as described herein may enable storage device 104 to outperform a storage device that uses MLC-fine programming with the required reliability. The implementations of two-page encoded foggy-fine write as described herein may thus save data transfers and NAND capacity typically used for the SLC cache for foggy-fine write (for example, two-pages rather than four-pages).

Figure 10:
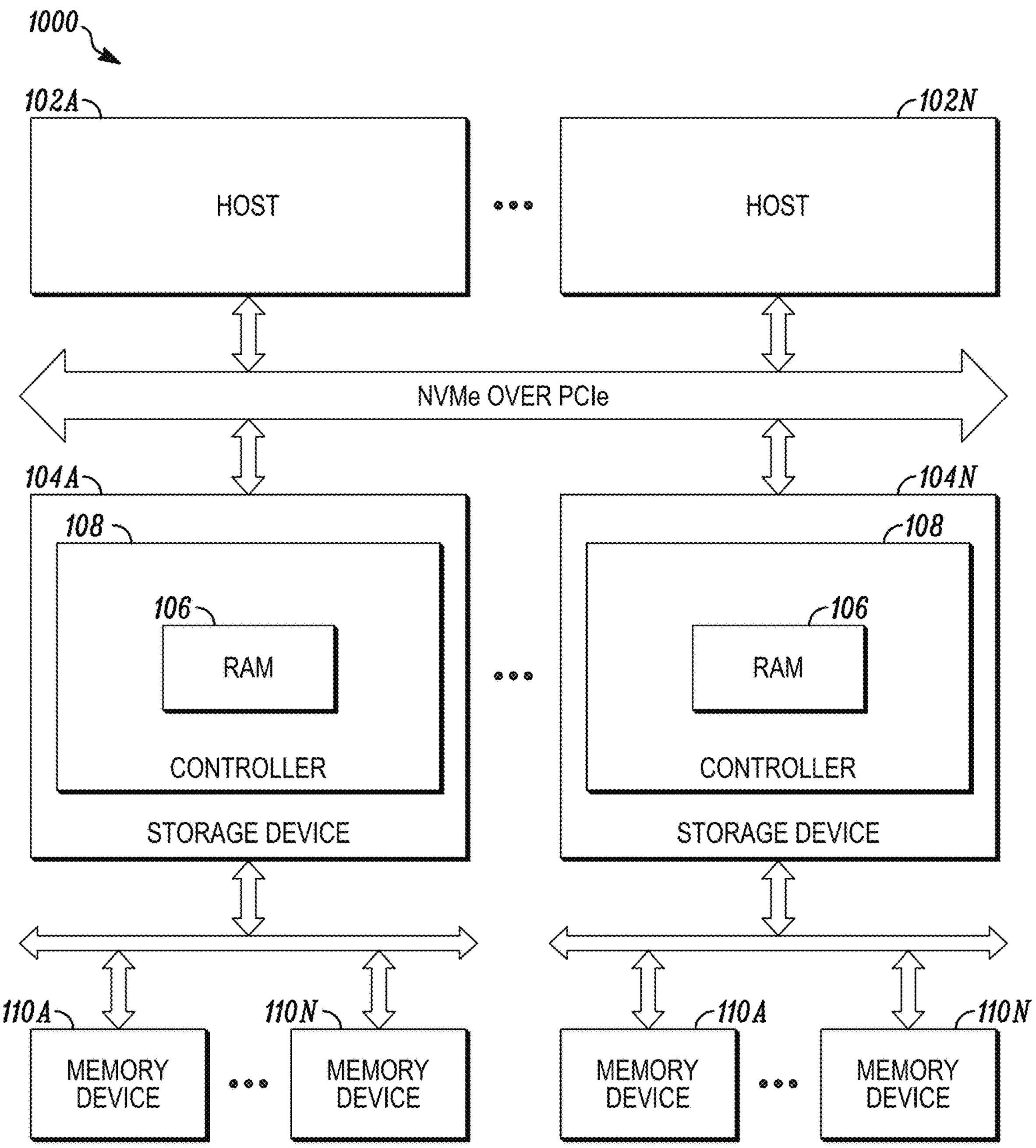
FIG. 10 is a diagram of an example environment in which systems and/or methods described herein are implemented.

FIG. 10 is a diagram of an example environment in which systems and/or methods described herein are implemented. As shown in FIG. 10, Environment 1000 may include hosts 102*a*-102*n* (referred to herein as host(s) 102), and one or more storage devices 104*a*-104*n* (referred to herein as storage device(s) 104). Memory device 110 may include a memory controller 206 to implement the enhanced foggy-fine operations. Hosts 102 and storage devices 104 may communicate via Non-Volatile Memory Express (NVMe) over peripheral component interconnect express (PCI Express or PCIe), SD, or the like.

Devices of Environment 1000 may interconnect via wired connections, wireless connections, or a combination of wired and wireless connections. For example, the network in FIG. 10 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of Environment 1000 may perform one or more functions described as being performed by another set of devices of Environment 1000.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A memory die to execute enhanced foggy-fine program operations to recover foggy programmed data including a distribution that has extended into multiple states, the memory die comprises:

blocks to store data in various formats; and a memory controller to receive data from a storage device, generate parity data and enhanced foggy data based on the data received from the storage device, perform a foggy program operation to a block, use the parity data and the enhanced foggy data to recover the data when a foggy distribution associated with the foggy program operation crosses beyond an adjacent distribution, and write recovered data to the block with a fine program operation.

2. The memory die of claim 1, wherein the enhanced foggy data is a red/green bit associated with a foggy state.

3. The memory die of claim 1, wherein the memory controller uses an encoded recovery table with the parity data and the enhanced foggy data to recover the data from a memory die coded according to a first transition when the foggy distribution overlaps into at least one other state.

4. The memory die of claim 3, wherein the encoded recovery table includes a green bit table and a red bit table, wherein the green bit table and the red bit table include entries including one of a number of states in the foggy distribution and a number of program disturb states, data retrieved from the memory die, the parity data assigned to a state, and the recovered data.

5. The memory die of claim 1, wherein the memory controller uses the parity data and the enhanced foggy data to determine a number of states included in the foggy distribution.

6. The memory die of claim 1, wherein the memory controller sets an internal working register to zero, reads data foggy programmed to data registers, and uses at least one of SET, AND, NOT, and OR logical operations to calculate a green bit and generate the enhanced foggy data.

7. The memory die of claim 1, wherein the memory controller uses at least one of SET, AND, NOT, and OR logical operations to generate flags associated with the parity data and the enhanced foggy data and uses the flags to correct foggy programmed data.

8. A method in a memory die for executing enhanced foggy-fine program operations to recover foggy programmed data including a distribution that has extended into multiple states, the memory die comprises a memory controller to execute the method comprising:

receiving data from a storage device;

generating parity data and enhanced foggy data based on the data received from the storage device and storing the parity data and the enhanced foggy data to a cache;

performing a foggy program operation to a block on the memory die;

performing a foggy read to retrieve the data written with the foggy program operation;

using the parity data and the enhanced foggy data to determine that a foggy distribution associated with the foggy program operation crosses beyond an adjacent distribution;

performing a foggy recovery by applying the parity data and the enhanced foggy data to recover data associated with the foggy distribution; and writing recovered data to the block with a fine program operation.

9. The method of claim 8, further comprising using the parity data and the enhanced foggy data to determine a number of states included in the foggy distribution.

10. The method of claim 8, further comprising using the parity data and the enhanced foggy data to identify an entry in a recovery table with the recovered data.

11. The method of claim 8, wherein the foggy program operation further comprising loading data from the storage device into registers on the memory die, generating a parity page for the data and writing the parity page to the cache in the memory die, generating the enhanced foggy data and writing the enhanced foggy data to the cache, and foggy programming the data to the memory die.

12. The method of claim 8, wherein the foggy read comprises copying the data from the block into registers on the memory die, reading the parity data from the cache, and processing the parity data with the data in the registers.

13. The method of claim 8, wherein the foggy recovery comprises reading the data from the block into registers on the memory die, retrieving the parity data and the enhanced foggy data from the cache, and processing the parity data and the enhanced foggy data with the data read into the registers.

14. The method of claim 8, wherein the foggy recovery comprises applying the parity data, the enhanced foggy data, and data read from the block to a recovery table to recover the data associated with the foggy distribution.

15. The method of claim 8, further comprising performing a host write operation including:

performing a foggy write by loading the data from the storage device into registers on memory device, generating the parity data and writing the parity data into the cache, generating the enhanced foggy data and writing the enhanced foggy data into the cache, and foggy programming the data into the block; and performing the fine program operation by fine programming the data to the block.

16. The method of claim 15, further comprising performing a foggy read repair operation prior to performing the fine program operation by retrieving the data from the block, retrieving the parity data from the cache to determine when there is an error, processing the data with the parity data and the enhanced foggy data; sending the data to the storage device for an audit, and performing the fine program operation to write the data to the block when the audit is successful.

17. The method of claim 8, further comprising performing a garbage collection write operation including:

performing a read operation by retrieving the data from a first block and transmitting the data to the storage device;

performing a foggy write by loading corrected data from the storage device into registers on memory device, generating the parity data and writing the parity data into a cache, generating the enhanced foggy data and writing the enhanced foggy data into the cache, and foggy programming the data into a second block; and performing the fine program operation by fine programming the data to the block.

18. The method of claim 17, further comprising performing a foggy read repair operation prior to performing the fine program operation by retrieving the data from the block, retrieving the parity data from the cache to determine when there is an error, processing the data with the parity data and the enhanced foggy data; sending the data to the storage device for an audit, and performing the fine program operation to write the data to the block when the audit is successful.

19. A method in a memory die for executing enhanced foggy-fine operations to recover foggy programmed data including a distribution that has extended into multiple states, the memory die comprises a memory controller to execute the method comprising:

receiving data from a storage device;

generating parity data and enhanced foggy data based on the data received from the storage device and storing the parity data and the enhanced foggy data in a cache;

performing a foggy program operation to store the data on a block on the memory die;

performing a foggy read to retrieve the data written with the foggy program operation;

using the parity data and the enhanced foggy data to determine that a foggy distribution associated with the foggy program operation crosses into at least one other state;

performing a foggy recovery by applying the parity data and the enhanced foggy data to a recovery table to locate an entry in the recovery table including recovered data associated with the foggy distribution; and writing the recovered data to the block with a fine program operation.

20. The method of claim 19, further comprising locating the entry in a section of the recovery table associated with the enhanced foggy data.

* * * * *